(12) United States Patent
Sakaue et al.

(10) Patent No.: US 10,759,508 B2
(45) Date of Patent: Sep. 1, 2020

(54) CHARGING SYSTEM FOR AUTONOMOUS UNDERWATER VEHICLE

(71) Applicant: KAWASAKI JUKOGYO KABUSHIKI KAISHA, Kobe-shi, Hyogo (JP)

(72) Inventors: Hiroshi Sakaue, Kobe (JP); Minehiko Mukaida, Kobe (JP); Noriyuki Okaya, Kobe (JP); Takashi Okada, Kobe (JP); Fumitaka Tachinami, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 22 days.

(21) Appl. No.: 15/766,758

(22) PCT Filed: Sep. 28, 2016

(86) PCT No.: PCT/JP2016/004371
§ 371 (c)(1),
(2) Date: Apr. 6, 2018

(87) PCT Pub. No.: WO2017/061084
PCT Pub. Date: Apr. 13, 2017

(65) Prior Publication Data
US 2018/0297677 A1    Oct. 18, 2018

(30) Foreign Application Priority Data

Oct. 6, 2015    (JP) .................................. 2015-198607

(51) Int. Cl.
*B63G 8/00*    (2006.01)
*H02J 50/00*   (2016.01)
(Continued)

(52) U.S. Cl.
CPC .............. *B63G 8/001* (2013.01); *B63C 11/00* (2013.01); *B63G 8/00* (2013.01); *H02J 7/00* (2013.01);
(Continued)

(58) Field of Classification Search
CPC .... B63G 8/001; B63G 8/00; B63G 2008/008; H02J 50/10; H02J 50/90; H02J 7/025; H02J 50/00; H02J 7/00; B63C 11/00
See application file for complete search history.

(56) References Cited

U.S. PATENT DOCUMENTS 5,301,096 A  *  4/1994  Klontz ..................... H01F 38/14
                                                     363/37
2010/0007214 A1* 1/2010 Howard ................ B60L 11/182
                                                     307/104
(Continued)

FOREIGN PATENT DOCUMENTS

JP    2001-055193 A    2/2001

*Primary Examiner* — Drew A Dunn
*Assistant Examiner* — Sailesh Thapa
(74) *Attorney, Agent, or Firm* — Oliff PLC

(57) ABSTRACT

A charging system for an autonomous underwater vehicle includes: a sea floating body; a charging station suspended in water from the body through a string-shaped body and located downstream of the sea floating body by receiving a water flow, the station including a noncontact electricity supplying portion located away from the string-shaped body; and an autonomous underwater vehicle coupled to the station that is rotatable about the string-shaped body, the vehicle including a noncontact electricity receiving portion configured to receive electricity supplied from the supplying portion, wherein: the station takes by the water flow such a posture that the noncontact electricity supplying portion is located downstream of the string-shaped body in a water flow direction; and when the vehicle is coupled to the station, the vehicle takes by the water flow such a posture (Continued)

that the receiving portion is located downstream of the string-shaped body in the water flow direction.

10 Claims, 5 Drawing Sheets

(51) Int. Cl.
  *H02J 7/00* (2006.01)
  *B63C 11/00* (2006.01)
  *H02J 50/90* (2016.01)
  *H02J 50/10* (2016.01)
  *H02J 7/02* (2016.01)

(52) U.S. Cl.
  CPC .............. *H02J 7/025* (2013.01); *H02J 50/00* (2016.02); *H02J 50/10* (2016.02); *H02J 50/90* (2016.02); *B63G 2008/008* (2013.01)

(56) References Cited

U.S. PATENT DOCUMENTS

| 2014/0232200 A1* | 8/2014 | Maekawa | B63G 8/001 |
| | | | 307/104 |
| 2016/0009344 A1* | 1/2016 | Jourdan | B63B 21/66 |
| | | | 114/321 |

* cited by examiner

CHARGING SYSTEM FOR AUTONOMOUS UNDERWATER VEHICLE

TECHNICAL FIELD

The present invention relates to a charging system for an autonomous underwater vehicle.

BACKGROUND ART

Conventionally known is an autonomous underwater vehicle (hereinafter may be referred to as an "AUV") which does not require electric power supply from a mother ship and sails in water by a built-in power source for seabed work, seabed investigation, and the like. PTL 1 discloses an AUV underwater base for charging the AUV in water without lifting the AUV to the mother ship.

The underwater base of PTL 1 is configured such that: a base mount is provided on the seabed; a seating base configured to be rotatable about a center axis extending in a vertical direction is provided on the base mount; and a signal transmitter used when the AUV measures the position of the underwater base and a connector connected to the AUV seated are provided at the seating base. Further, the underwater base is provided with a direction stabilizing fin by which the seating base is directed to a water flow direction by water flow. With this, the seating base is directed to the water flow direction at all times. Therefore, the AUV can always sail toward and seat on the seating base in a posture directed to an upstream direction, such posture being stable in terms of machine body control.

CITATION LIST

Patent Literature

PTL 1: Japanese Laid-Open Patent Application Publication No. 2001-55193

SUMMARY OF INVENTION

Technical Problem

However, according to the underwater base of PTL 1, large-scale construction work is required to set up the base mount on the seabed. On the other hand, when the underwater base for charging is not provided, the AUV needs to be lifted to the mother ship for charging as in conventional cases, and this requires a lot of labor.

An object of the present invention is to provide a charging system for an AUV, the charging system realizing charging of the AUV in water without providing a base for charging in water.

Solution to Problem

To solve the above problems, a charging system for an AUV according to the present invention includes: a sea floating body floating on a sea; a charging station suspended in water from the sea floating body through a string-shaped body and located downstream of the sea floating body in a water flow direction by receiving a water flow, the charging station including a noncontact electricity supplying portion located at a position away from the string-shaped body; and an AUV coupled to the charging station so as to be rotatable about the string-shaped body, the AUV including a noncontact electricity receiving portion configured to receive electricity supplied from the noncontact electricity supplying portion, wherein: the charging station takes by the water flow such a posture that the noncontact electricity supplying portion is located downstream of the string-shaped body in the water flow direction; and in a state where the AUV is coupled to the charging station, the AUV takes by the water flow such a posture that the noncontact electricity receiving portion is located downstream of the string-shaped body in the water flow direction.

According to the above configuration, the AUV is charged by being coupled to the charging station suspended from the sea floating body floating on the sea. Therefore, it is unnecessary to provide a base for charging in water. Further, the direction of the charging station and the direction of the AUV can be caused to coincide with each other by utilizing the water flow. Therefore, the noncontact electricity receiving portion of the AUV and the noncontact electricity supplying portion of the charging station suspended from the sea floating body can be easily positioned, and the charging of the AUV in water can be realized.

In the above charging system for the AUV, the charging station may include a captured portion fixed to the string-shaped body and a station main body coupled to the captured portion, and the AUV may include an underwater vehicle main body and a capturing mechanism provided at a front end portion of the underwater vehicle main body and configured to capture the captured portion so as to be rotatable about the string-shaped body relative to the captured portion. According to this configuration, the capturing mechanism captures the captured portion so as to be rotatable about the string-shaped body relative to the captured portion. Therefore, in a state where the capturing mechanism captures the captured portion, the noncontact electricity supplying portion and the noncontact electricity receiving portion can be moved based on the captured portion to be positioned such that the noncontact electricity supplying portion and the noncontact electricity receiving portion can realize the supply of the electricity.

In the above charging system for the AUV, the station main body may include a supporting portion supporting the noncontact electricity supplying portion and an upward extending portion extending upward from the supporting portion beyond the noncontact electricity supplying portion and including a tip end coupled to the captured portion, and the noncontact electricity receiving portion may be provided at a lower portion of the underwater vehicle main body. According to this configuration, the shape of the station main body can be designed to be a simple shape corresponding to an outer shape of the underwater vehicle main body.

In the above charging system for the AUV, the supporting portion may have a rod shape, the upward extending portion may extend upward from one end of the supporting portion, and the supporting portion may be provided with a vertical wing and a horizontal wing. According to this configuration, while realizing the supporting portion having a shape that is low in water resistance, the horizontal posture of the charging station that has received the water flow can be defined by the vertical wing, and the vertical posture of the charging station that has received the water flow can be defined by the horizontal wing.

In the above charging system for the AUV, the captured portion may have a disc shape, the string-shaped body may be connected to a center of an upper surface of the captured portion, and the capturing mechanism may include a fitting portion which is open to a front side and a lower side, the string-shaped body being inserted into the fitting portion from the front side, the captured portion being inserted into the fitting portion from the lower side. According to this configuration, the AUV can be coupled to the charging station by moving the AUV downward toward the charging station along the string-shaped body inserted into the fitting portion through a front opening. Further, by moving the AUV upward, the AUV can separate from the charging station. Therefore, the AUV and the charging station can be more easily coupled to and separate from each other.

In the above charging system for the AUV, the upward extending portion may be coupled to the captured portion so as to be swingable about an axis extending in a direction perpendicular to the string-shaped body, and the capturing mechanism may include a holding portion fixed to the front end portion of the underwater vehicle main body, the holding portion holding the fitting portion so as to be swingable about an axis extending in a leftward/rightward direction of the autonomous underwater vehicle. According to this configuration, the station main body is swingable relative to the captured portion. Therefore, even when the direction of the captured portion is changed by being pulled through the string-shaped body, the posture of the station main body relative to the water flow direction can be stably maintained. Further, the fitting portion is swingable relative to the holding portion fixed to the underwater vehicle main body. Therefore, even when the direction of the captured portion is changed by being pulled through the string-shaped body, the posture of the underwater vehicle main body relative to the water flow direction can be stably maintained.

In the above charging system for the AUV, the charging station may be provided with a light emitting portion configured to illuminate the string-shaped body with light, and the AUV may include an image pickup device, a propulsion device, and a control device configured to control the propulsion device based on data of an image taken by the image pickup device. According to this configuration, the AUV can be accurately moved closer to the charging station.

In the above charging system for the AUV, the charging station may be provided with a transponder configured to transmit an acoustic signal, and the AUV may be provided with an acoustic positioning device configured to measure a distance to the transponder based on the acoustic signal transmitted from the transponder. According to this configuration, the acoustic positioning device can measure the position of the AUV relative to the charging station based on the acoustic signal transmitted from the transponder. Therefore, the AUV can be guided to the charging station from a position away from the charging station by a middle or long distance.

In the above charging system for the AUV, the AUV and the charging station may be provided with respective optical wireless communication devices configured to mutually perform optical wireless communication. According to this configuration, data acquired by the AUV can be transmitted from the AUV through the optical wireless communication devices to the charging station, and a control program of the AUV can be transmitted from the charging station through the optical wireless communication devices to the AUV.

In the above charging system for the AUV, the sea floating body may be a ship that sails on the sea. According to this configuration, the ship tows the charging station with the AUV coupled to the charging station, and this can cause the AUV and the charging station to receive the water flow.

Advantageous Effects of Invention

The present invention can provide the charging system for the AUV, the charging system realizing charging of the AUV in water without providing a base for charging in water.

DESCRIPTION OF EMBODIMENTS

Figure 1:
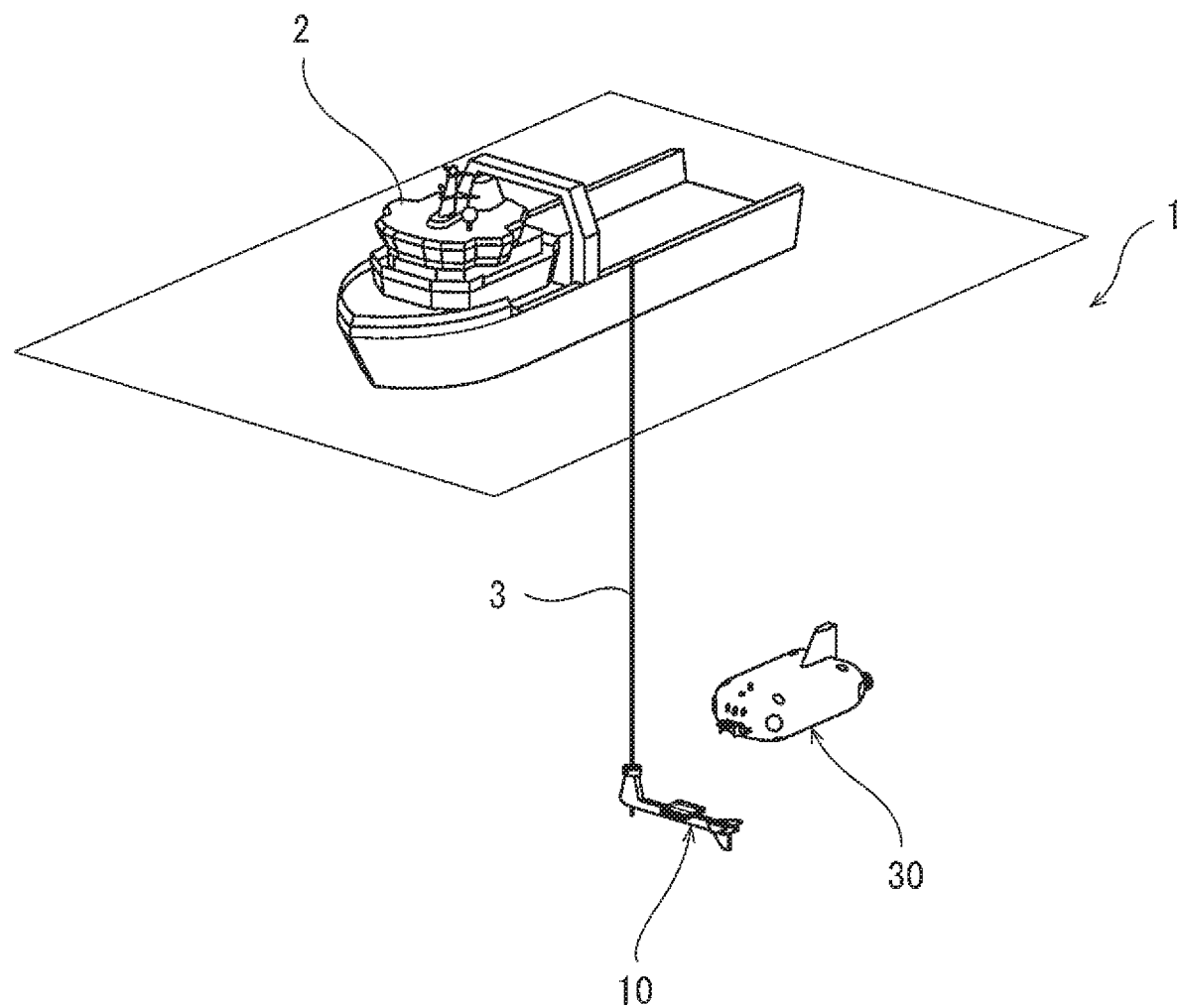
FIG. 1 is a schematic configuration diagram of a charging system for an AUV according to one embodiment of the present invention.

Hereinafter, an embodiment of the present invention will be explained in reference to the drawings. FIG. 1 is a schematic configuration diagram of a charging system 1 according to one embodiment. The charging system 1 charges an AUV 30 in water. The charging system 1 includes: a sea floating body 2 floating on a sea; a charging station 10 suspended from the sea floating body 2 through a string-shaped body 3 in water; and the AUV 30 coupled to and charged by the charging station 10. In the present embodiment, the sea floating body 2 is a ship that sails on the sea. However, the sea floating body 2 may be a sailing body such as a self-traveling buoy, instead of the ship that sails on the sea. The string-shaped body 3 serves as, for example, one or both of a power transmission cable for transmitting electricity from the sea floating body 2 to the charging station 10 and a communication cable for communicating with the sea floating body 2.

Figure 2:
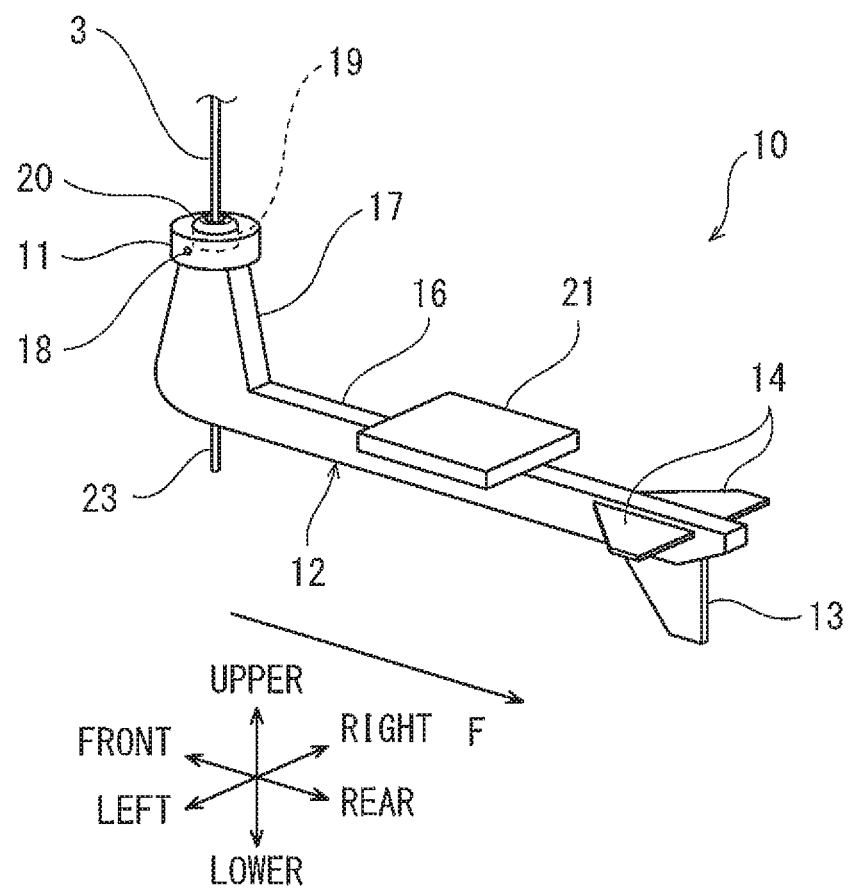
FIG. 2 is a perspective view of a charging station of the charging system of FIG. 1.

FIG. 2 is a perspective view of the charging station 10 of the charging system 1. In the present embodiment, when charging station 10 receives water flow, the charging station 10 moves to a downstream side in a water flow direction F to be positioned downstream of the sea floating body 2. Further, the charging station 10 takes a predetermined posture (i.e., is directed to the flow direction F) in accordance with the water flow. In the present embodiment, the "water flow" denotes a movement of water relative to the charging station 10 around the charging station 10. For example, the "water flow" denotes not only a tidal current that is the flow of sea water but also a movement of water relative to the charging station 10 around the charging station 10 by the movement of the charging station 10 itself in water. In the following explanations, regarding the charging station 10 that receives the water flow, an upstream side in the water flow direction F is defined as a front side, and a downstream side in the water flow direction F is defined as a rear side. A leftward direction when facing the water flow direction F is defined as a left side, and a rightward direction when facing the water flow direction F is defined as a right side. A vertically upward direction is defined as an upper side, and a vertically downward direction is defined as a lower side.

The charging station 10 includes: a captured portion 11 fixed to the string-shaped body 3; and a station main body 12 coupled to the captured portion 11. A noncontact electricity supplying portion 21 configured to supply electricity to the AUV 30 is provided at the station main body 12.

The station main body 12 includes: a rod-shaped supporting portion 16 supporting the noncontact electricity supplying portion 21; and an upward extending portion 17 extending upward from one end of the supporting portion 16. The upward extending portion 17 and the supporting portion 16 are formed integrally. The supporting portion 16 is formed so as to extend from the upstream side to the downstream side along the water flow direction F when the charging station 10 receives the water flow. The noncontact electricity supplying portion 21 is fixed to an upper portion of the supporting portion 16 so as to be located away from the upward extending portion 17. The upward extending portion 17 extends upward from the supporting portion 16 beyond the noncontact electricity supplying portion 21. A tip end of the upward extending portion 17 is coupled to the captured portion 11.

The captured portion 11 has a disc shape, and the string-shaped body 3 extending from the sea floating body 2 is connected to a center of an upper surface of the captured portion 11. The captured portion 11 is coupled to the upward extending portion 17 such that the upward extending portion 17 is swingable about an axis extending in a direction perpendicular to the string-shaped body 3, i.e., an axis extending in a direction perpendicular to a center axis direction of the captured portion 11. More specifically, the captured portion 11 supports an upper portion of the upward extending portion 17 by a pivot shaft 18 extending in a leftward/rightward direction, and the station main body 12 is swingable relative to the captured portion 11 about the pivot shaft 18.

Each of the noncontact electricity supplying portion 21 and a below-described noncontact electricity receiving portion 35 includes, for example, a flat plate-shaped housing and a coil formed in the housing and having a circular shape. The noncontact electricity supplying portion 21 is fixed to the supporting portion 16 such that one main surface thereof opposing the noncontact electricity receiving portion 35 faces upward.

The station main body 12 is provided with a vertical wing 13 and a horizontal wing 14 by which the charging station 10 takes a predetermined posture in accordance with the water flow. The vertical wing 13 and the horizontal wing 14 are provided at a rear portion of the supporting portion 16, i.e., at a portion of the supporting portion 16 which portion is located at the downstream side in the water flow direction F when the charging station 10 receives the water flow.

The vertical wing 13 has a function of defining a horizontal posture of the charging station 10 that has received the water flow. More specifically, when the vertical wing 13 receives the water flow, the station main body 12 of the charging station 10 rotates about the string-shaped body 3 (i.e., about a vertical line passing through the captured portion 11 to which the string-shaped body 3 is fixed). As a result, the charging station 10 takes such a posture that the supporting portion 16 of the station main body 12 extends from the upward extending portion 17 to the downstream side in the flow direction F. In other words, the charging station 10 takes such a posture that the noncontact electricity supplying portion 21 located away from the captured portion 11 is located downstream of the string-shaped body 3 in the water flow direction F.

The horizontal wing 14 has a function of defining a vertical posture of the charging station 10 that has received the water flow. More specifically, when the charging station 10 receives the water flow, the charging station 10 moves to the downstream side of the sea floating body 2 in the water flow direction F. As a result, the captured portion 11 pulled by the string-shaped body 3 rotates about the pivot shaft 18 relative to the station main body 12 such that the center axis direction of the captured portion 11 is inclined relative to the vertical line. On the other hand, even when the direction of the captured portion 11 changes, the supporting portion 16 of the station main body 12 takes a posture substantially parallel to the water flow direction F by the effect of the horizontal wing 14.

The charging station 10 is provided with a transponder 23 configured to transmit an acoustic signal. The transponder 23 and a below-described acoustic positioning device 36 constitute an acoustic positioning system configured to measure the position of the AUV 30 relative to the charging station 10.

The charging station 10 is provided with an optical wireless communication device 19 configured to communicate with the AUV 30. The optical wireless communication device 19 is provided at the captured portion 11 and includes a light emitting portion 20 configured to emit light to the upper side of the captured portion 11. In the present embodiment, the light emitting portion 20 of the optical wireless communication device 19 also plays a role of illuminating the string-shaped body 3 with light when coupling the AUV 30 to the charging station 10.

Figure 3:
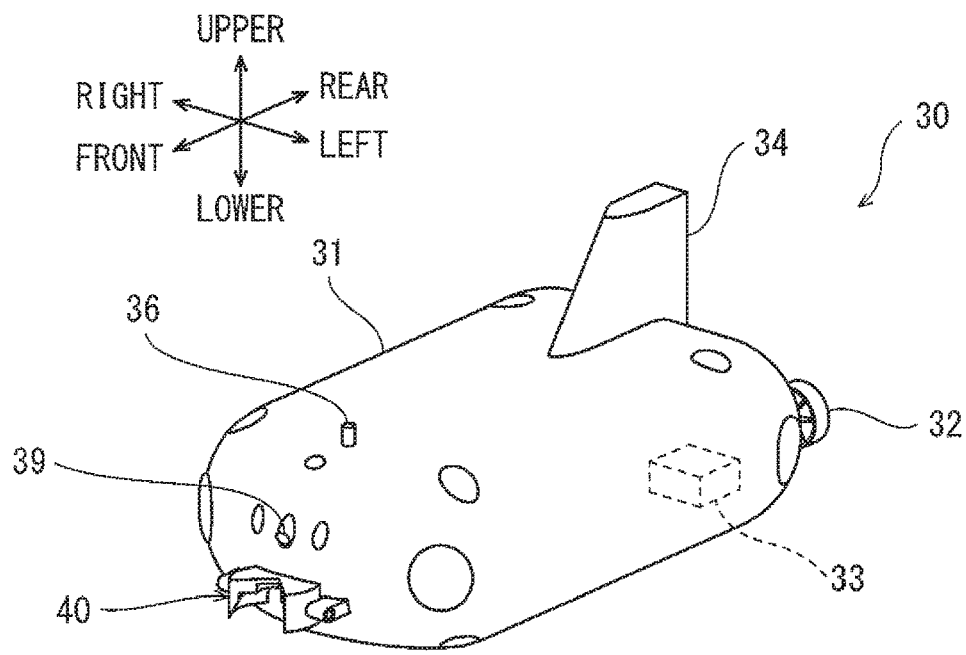
FIG. 3 is a schematic perspective view when viewing the AUV of the charging system of FIG. 1 obliquely from above.
Figure 4:
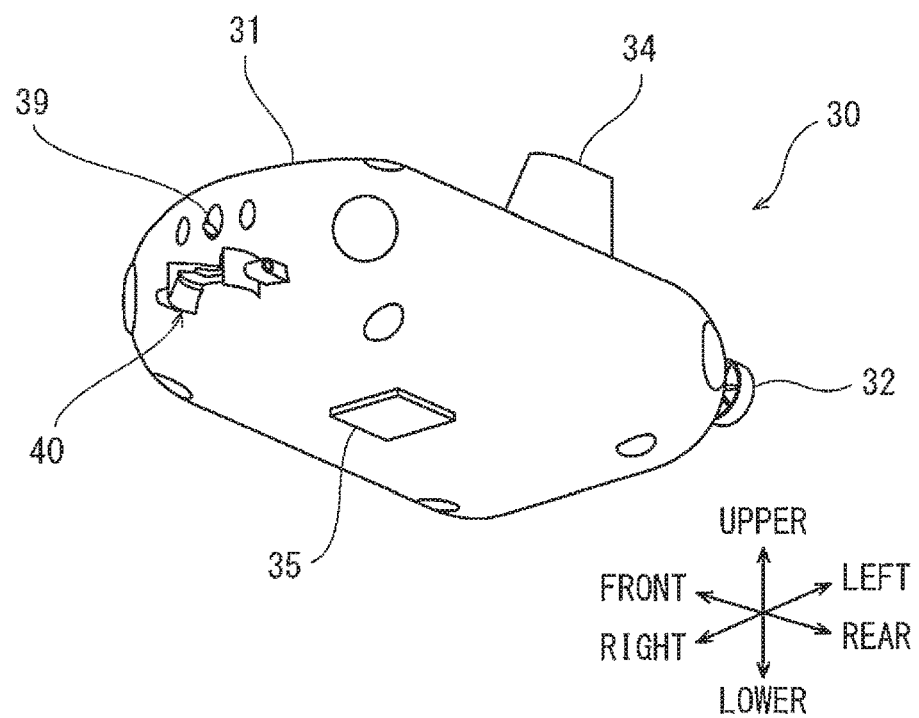
FIG. 4 is a schematic perspective view when viewing the AUV of the charging system of FIG. 1 obliquely from below.

FIG. 3 is a schematic perspective view when viewing the AUV 30 obliquely from above. FIG. 4 is a schematic perspective view when viewing the AUV 30 obliquely from below. In the following explanations, regarding the AUV 30, a traveling direction in which the AUV 30 travels is defined as a front side, and a direction opposite to the traveling direction is defined as a rear side. A left side when facing the traveling direction is defined as a left side, and a right side when facing the traveling direction is defined as a right side. An upper side when facing the traveling direction is defined as an upper side, and a lower side when facing the traveling direction is defined as a lower side.

The AUV 30 includes: an underwater vehicle main body 31 incorporating a storage battery as a power source; and some propulsion devices 32 (only one propulsion device 32 is shown in the drawings), such as propellers, configured to generate propulsive force for sailing in water. The AUV 30 includes a control device 33 provided in the underwater vehicle main body 31 and configured to control the propulsion device 32. The AUV 30 autonomously sails in accordance with a program of the control device 33. A front portion of the underwater vehicle main body 31 has a streamline shape that is low in water resistance. Upper and lower portions of the underwater vehicle main body 31 are formed to have respective flat surfaces parallel to each other. The above-described noncontact electricity receiving portion 35 configured to receive electricity from the noncontact electricity supplying portion 21 of the charging station 10 is provided at the lower portion of the underwater vehicle main body 31. The noncontact electricity receiving portion 35 is fixed to the lower portion of the underwater vehicle main body 31 such that one main surface thereof opposing the noncontact electricity supplying portion 21 faces downward.

In the present embodiment, to receive electricity from the charging station 10, the AUV 30 is first coupled to the charging station 10 in water. The AUV 30 includes a capturing mechanism 40 configured to capture the captured portion 11 of the charging station 10. When the capturing mechanism 40 captures the captured portion 11, the AUV 30 is coupled to the charging station 10. The capturing mechanism 40 is provided at a front end portion of the underwater vehicle main body 31, i.e., a traveling-direction front portion of the AUV 30.

Figure 5:
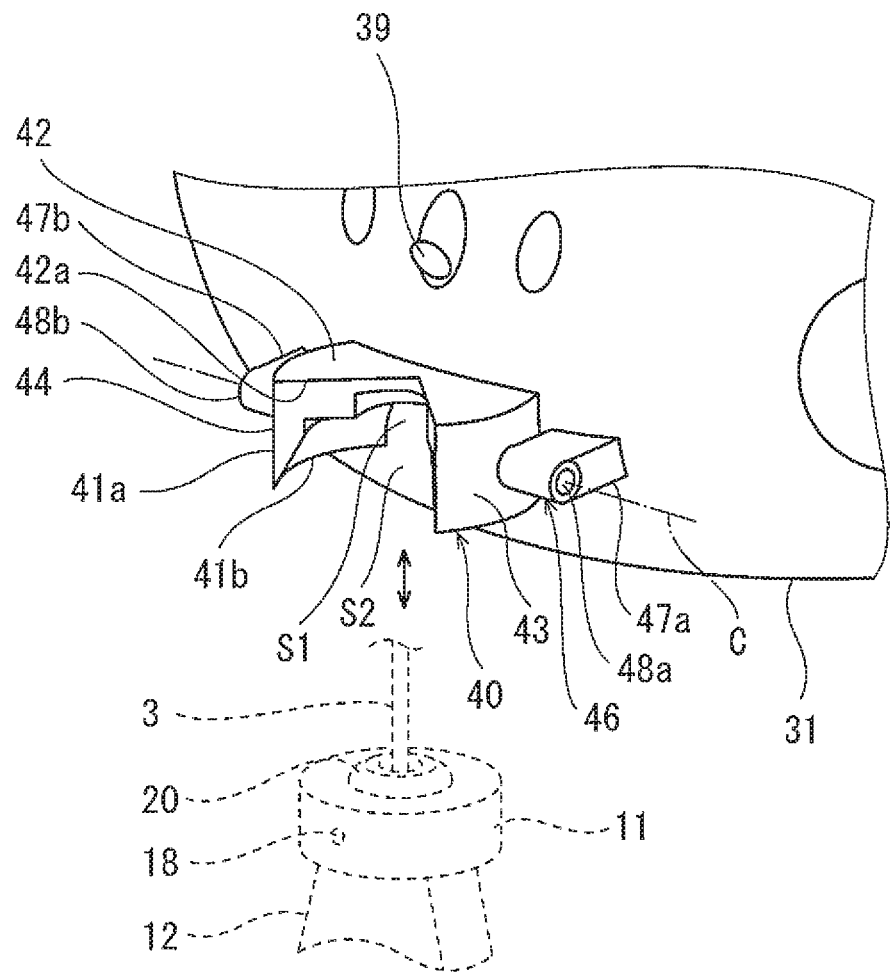
FIG. 5 is an enlarged view of a capturing mechanism of the AUV shown in FIG. 1.

FIG. 5 is an enlarged view of the capturing mechanism 40 of the AUV 30. In the present embodiment, the capturing mechanism 40 is formed so as to cover the captured portion 11. The capturing mechanism 40 includes: a fitting portion 41 in which the captured portion 11 is fitted; and a holding portion 46 fixed to the front end portion of the underwater vehicle main body 31 and holding the fitting portion 41.

The fitting portion 41 includes: a front opening portion 41a that is open to the front side; and a lower opening portion 41b that is open to the lower side. When coupling the AUV 30 to the charging station 10, the string-shaped body 3 is inserted into the fitting portion 41 through the front opening portion 41a from the front side of the fitting portion 41, and the captured portion 11 is inserted into the fitting portion 41 through the lower opening portion 41b from the lower side of the fitting portion 41. The front opening portion 41a is formed so as to extend in an upward/downward direction such that the string-shaped body 3 is inserted through the front opening portion 41a. A lower part of the front opening portion 41a and a front part of the lower opening portion 41b are connected to each other.

The fitting portion 41 forms: a fitting space S1 formed to have a size in which the captured portion 11 is fitted; and a guiding space S2 which is located at the lower side of the fitting space S1 and spreads toward the lower side for guiding the captured portion 11 to the fitting space S1. In a state where the AUV 30 is coupled to the charging station 10, the fitting portion 41 is rotatable about the string-shaped body 3. In the present embodiment, the fitting space S1 is formed in a disc shape as with the captured portion 11. Together with the underwater vehicle main body 31 fixed to the capturing mechanism 40, the capturing mechanism 40 rotates about the string-shaped body 3 relative to the captured portion 11 while keeping capturing the captured portion 11.

The fitting portion 41 includes: an upper wall portion 42 covering an upper surface portion of the captured portion 11; a left side wall portion 43 extending downward from a circular-arc left end portion of the upper wall portion 42; and a right side wall portion 44 extending downward from a circular-arc right end portion of the upper wall portion 42. The front opening portion 41a is constituted by a front end portion of the left side wall portion 43 and a front end portion of the right side wall portion 44, and the lower opening portion 41b is constituted by a lower end portion of the left side wall portion 43 and a lower end portion of the right side wall portion 44. In plan view, a front end portion 42a of the upper wall portion 42 has a V shape that gradually narrows toward the rear side. When the string-shaped body 3 is pressed against the V-shaped front end portion 42a, the string-shaped body 3 is guided to a middle side of the fitting portion 41.

The holding portion 46 holds the fitting portion 41 such that the fitting portion 41 is swingable about an axis C extending in the leftward/rightward direction of the AUV 30. More specifically, the holding portion 46 includes: a pair of fixed portions 47a and 47b located at both respective leftward/rightward direction sides of the fitting portion 41 and fixed to the underwater vehicle main body 31; and a pair of pivot shafts 48a and 48b supported by the respective fixed portions 47a and 47b. The axis C extends in the leftward/rightward direction of the AUV 30 so as to pass through the fitting space S1 of the fitting portion 41. The pair of pivot shafts 48a and 48b are located on the axis C. The fitting portion 41 is supported by the pair of pivot shafts 48a and 48b so as to be swingable.

Referring back to FIGS. 3 and 4, the underwater vehicle main body 31 is provided with a vertical wing 34. The vertical wing 34 has the same function as the vertical wing 13 of the charging station 10. When the propulsion device 32 is stopped after the AUV 30 is coupled to the charging station 10, the vertical wing 34 receives the water flow, and the underwater vehicle main body 31 rotates about the string-shaped body 3 (i.e., about the vertical line passing through the captured portion 11) relative to the captured portion 11. As a result, a rear end portion of the AUV 30 moves to the downstream side in the water flow direction F, and the AUV 30 takes such a posture that the noncontact electricity receiving portion 35 is located downstream of the string-shaped body 3 in the water flow direction F. In the present embodiment, since the AUV 30 and the charging station 10 in a coupled state are located at the same position in water, the flow direction F of the water received by the AUV 30 and the flow direction F of the water received by the charging station 10 are the same as each other.

The noncontact electricity receiving portion 35 and the noncontact electricity supplying portion 21 are respectively arranged at the AUV 30 and the charging station 10 such that when the charging station 10 and the AUV 30 in a coupled state receive the water flow, the noncontact electricity receiving portion 35 and the noncontact electricity supplying portion 21 face each other at a position downstream of the string-shaped body 3 in the water flow direction F. To be specific, the noncontact electricity receiving portion 35 and the noncontact electricity supplying portion 21 are arranged such that a distance from the noncontact electricity receiving portion 35 of the AUV 30 to the capturing mechanism 40 in the water flow direction F and a distance from the noncontact electricity supplying portion 21 of the charging station 10 to the captured portion 11 in the water flow direction F are substantially equal to each other. Therefore, after the AUV 30 and the charging station 10 are coupled to each other, the AUV 30 and the charging station 10 receive the water flow to take postures along the water flow direction F, and with this, the AUV 30 can receive electricity from the charging station 10.

To couple the AUV 30 and the charging station 10 to each other, the AUV 30 and the charging station 10 include a positioning system configured to measure the position of the AUV 30 relative to the charging station 10.

As described above, the AUV 30 is provided with the acoustic positioning device 36, and the acoustic positioning device 36 and the transponder 23 of the charging station 10 constitute the acoustic positioning system configured to measure the position of the AUV 30 relative to the charging station 10. The acoustic positioning system is, for example, a SSBL (Super Short Base Line) positioning system configured such that: a distance to the transponder 23 is calculated from a time until when the acoustic signal from the transponder 23 is received; and a direction is calculated based on a phase difference of sound waves which have reached respective elements of a wave receiving array included in the acoustic positioning device 36. In the present embodiment, this positioning system is used when a distance from the charging station 10 to the AUV 30 is longer than a predetermined distance (for example, 10 meters). The control device 33 controls the propulsion device 32 based on position data acquired by the acoustic positioning device 36 to guide the AUV 30 to the charging station 10.

In the present embodiment, the AUV 30 includes an image pickup device (not shown). The image pickup device is used to measure the position of the AUV 30 when the AUV 30 is located within a range of not more than a predetermined distance (for example, 10 meters) from the charging station 10. More specifically, the image pickup device of the AUV 30 takes an image of the string-shaped body 3 illuminated with light by the light emitting portion 20 and transmits data of the image to the control device 33. The control device 33 acquires data of the position of the AUV 30 relative to the charging station 10 based on the data of the image and controls the propulsion device 32 based on the data of the position. Thus, the AUV 30 can be accurately moved closer to the charging station 10.

The AUV 30 is provided with an optical wireless communication device 39. The optical wireless communication device 39 of the AUV 30 and the above-described optical wireless communication device 19 of the charging station 10 are arranged so as to be able to mutually perform optical wireless communication at least while the AUV 30 and the charging station 10 are coupled to each other. In the present embodiment, the optical wireless communication device 39 of the AUV 30 is arranged at the front end portion of the underwater vehicle main body 31 and above the capturing mechanism 40 so as to be able to receive a light signal from the light emitting portion 20 of the charging station 10. By the optical wireless communication devices 19 and 39, the AUV 30 can, for example, transmit to the charging station 10 inspection data acquired by an inspection performed by the AUV 30, and the charging station 10 can, for example, transmit an operation program of the AUV 30 to the AUV 30.

Next, charging steps through which the AUV 30 is charged by the charging system 1 will be explained in reference to FIGS. 6A to 6D.

First, when the charging station 10 suspended from the sea floating body 2 is located at a position away from the AUV 30 by a middle or long distance, in other words, when a distance from the AUV 30 to the charging station 10 is longer than a predetermined distance (for example, 10 meters), the AUV 30 moves toward the charging station 10. More specifically, based on the acoustic signal transmitted from the transponder 23 of the charging station 10, the AUV 30 measures the position of the AUV 30 relative to the charging station 10. Based on the acquired data of the position of the AUV 30, the control device 33 of the AUV 30 controls the propulsion device 32 to guide the AUV 30 to the charging station 10.

Figure 6A:
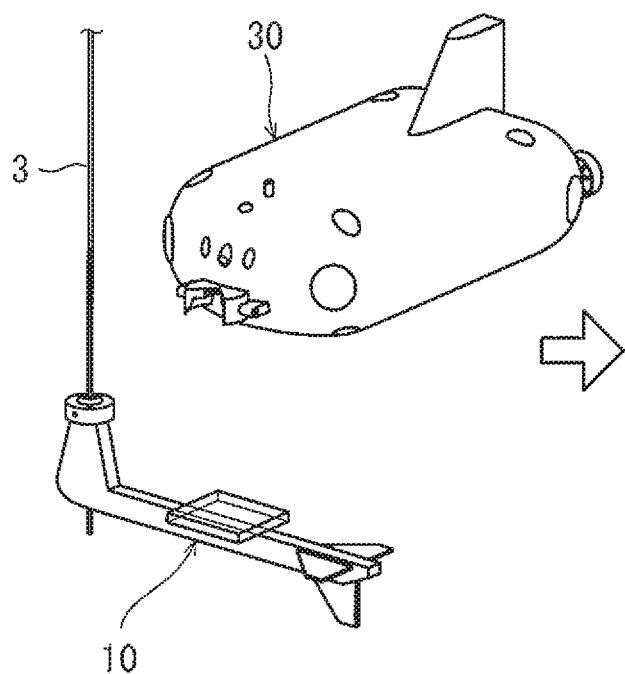
FIGS. 6A to 6D are diagrams for explaining charging steps performed by the charging system of FIG. 1.
Figure 6B:
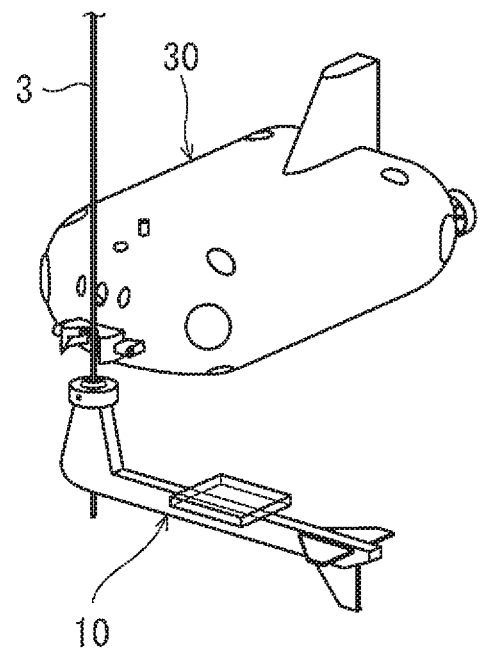

As shown in FIG. 6A, when the charging station 10 is located at a position away from the AUV 30 by a short distance, in other words, when the distance from the AUV 30 to the charging station 10 is not more than the predetermined distance (for example, 10 meters), the AUV 30 moves until the capturing mechanism 40 contacts the string-shaped body 3 (see FIG. 6B). More specifically, the light emitting portion 20 of the charging station 10 emits light toward the string-shaped body 3. The image pickup device of the AUV 30 takes an image of the string-shaped body 3 illuminated with light, and based on the data of the image, the AUV 30 drives the propulsion device 32 such that the string-shaped body 3 is inserted into the fitting portion 41 from the front side. As a result, the string-shaped body 3 is located in the vicinity of a middle of the capturing mechanism 40 of the AUV 30.

Figure 6C:
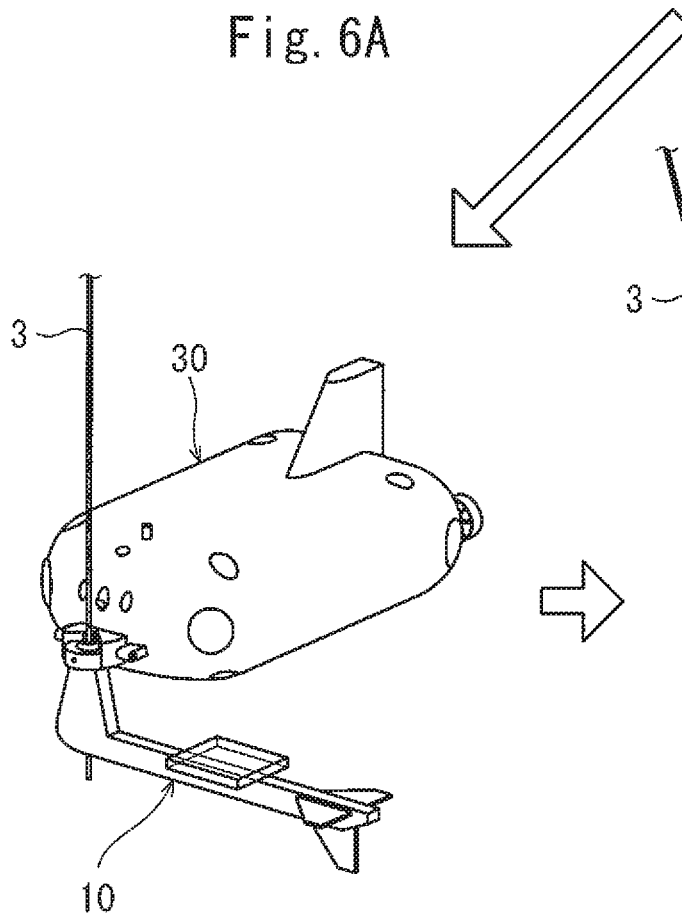

Next, the AUV 30 moves downward toward the charging station 10 along the string-shaped body 3 until the capturing mechanism 40 captures the captured portion 11 (see FIG. 6C). When the capturing mechanism 40 captures the captured portion 11, and with this, the AUV 30 is coupled to the charging station 10, the AUV 30 stops the propulsion device 32, and then, the sea floating body 2 tows the charging station 10 and the AUV 30 coupled to the charging station 10. It should be noted that a method of detecting whether or not the capturing mechanism 40 has captured the captured portion 11 may be any method. For example, whether or not the capturing mechanism 40 has captured the captured portion 11 may be detected by a proximity sensor provided at the captured portion 11, and a detection result of the proximity sensor may be transmitted to the sea floating body 2 through the string-shaped body 3.

Figure 6D:
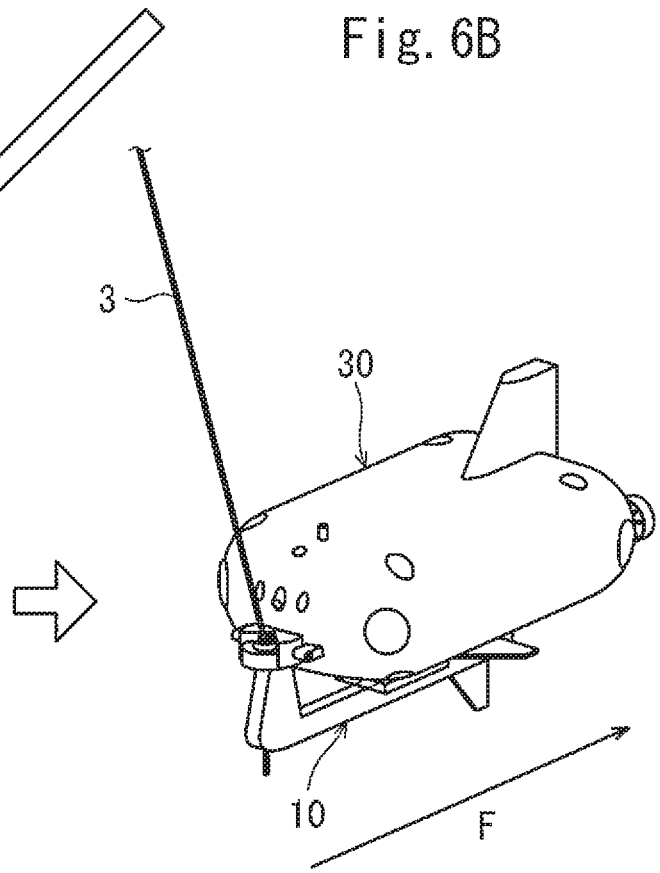

When the charging station 10 is towed, as shown in FIG. 6D, the charging station 10 receives the water flow and therefore rotates about the string-shaped body 3. Thus, the charging station 10 takes such a posture that the noncontact electricity supplying portion 21 is located downstream of the string-shaped body 3 in the water flow direction F. On the other hand, when the AUV 30 coupled to the charging station 10 is towed, the AUV 30 receives the water flow and therefore rotates about the string-shaped body 3. Thus, the AUV 30 takes such a posture that the noncontact electricity receiving portion 35 is located downstream of the string-shaped body 3 in the water flow direction F. With this, the direction of the charging station 10 and the direction of the AUV 30 coincide with each other, and the noncontact electricity receiving portion 35 of the AUV 30 and the noncontact electricity supplying portion 21 of the charging station 10 are positioned so as to realize the supply of the electricity. After that, the charging station 10 starts supplying electricity from the noncontact electricity supplying portion 21 to the noncontact electricity receiving portion 35.

While the AUV 30 is receiving the water flow, the fitting portion 41 of the capturing mechanism 40 keeps on receiving force from the captured portion 11 in a direction in which the string-shaped body 3 extends. Therefore, even when the propulsion device 32 is in a stop state, a state where the AUV 30 is coupled to the charging station 10 is maintained. After the charging is terminated, the AUV 30 is moved upward by driving the propulsion device 32. Thus, the AUV 30 separates from the charging station 10.

As explained above, according to the charging system 1 for the AUV 30 in the present embodiment, the AUV 30 is charged by being coupled to the charging station 10 suspended from the sea floating body 2 floating on the sea. Therefore, it is unnecessary to provide a base for charging in water. Further, a place where the AUV 30 is charged can be easily changed by changing the position of the sea floating body 2.

Further, the direction of the charging station 10 and the direction of the AUV 30 can be caused to coincide with each other by utilizing the water flow. Therefore, the noncontact electricity receiving portion 35 of the AUV 30 and the noncontact electricity supplying portion 21 of the charging station 10 suspended from the sea floating body 2 can be easily positioned, and the charging of the AUV 30 in water can be realized.

Further, the ship that is the sea floating body 2 tows the AUV 30 and the charging station 10, and this can actively generate the water flow received by the AUV 30 and the charging station 10. Therefore, even at a place where the water flow is weak, the direction of the charging station 10 and the direction of the AUV 30 can be caused to coincide with each other.

In the present embodiment, the capturing mechanism 40 captures the captured portion 11 so as to be rotatable about the string-shaped body 3 relative to the captured portion 11.

Therefore, in a state where the capturing mechanism 40 captures the captured portion 11, the noncontact electricity supplying portion 21 and the noncontact electricity receiving portion 35 can be moved based on the captured portion 11 to be positioned such that the noncontact electricity supplying portion 21 and the noncontact electricity receiving portion 35 can realize the supply of the electricity.

In the present embodiment, the station main body 12 includes: the supporting portion 16 supporting the noncontact electricity supplying portion 21; and the upward extending portion 17 extending upward beyond the noncontact electricity supplying portion 21 and including the tip end coupled to the captured portion 11, and the noncontact electricity receiving portion 35 is provided at the lower portion of the underwater vehicle main body 31. Therefore, the shape of the station main body 12 can be designed to be a simple shape corresponding to an outer shape of the underwater vehicle main body 31. Further, each of the noncontact electricity supplying portion 21 and the noncontact electricity receiving portion 35 can be arranged at such positions as to be unlikely to increase water resistance in a state where the AUV 30 is coupled to the charging station 10. With this, the noncontact electricity supplying portion 21 and the noncontact electricity receiving portion 35 can be increased in size, and this can increase a facing area. Thus, the supplied electricity can be increased.

In the present embodiment, the supporting portion 16 has a rod shape, and the upward extending portion 17 extends upward from one end of the supporting portion 16. Further, the supporting portion 16 is provided with the vertical wing 13 and the horizontal wing 14. Therefore, while realizing the supporting portion 16 having a shape that is low in water resistance, the horizontal posture of the charging station 10 that has received the water flow can be defined by the vertical wing 13, and the vertical posture of the charging station 10 that has received the water flow can be defined by the horizontal wing 14.

In the present embodiment, the string-shaped body 3 is inserted into the fitting portion 41 through the front opening portion 41a, and then, the AUV 30 is moved downward toward the charging station 10 along the string-shaped body 3. With this, the AUV 30 can be coupled to the charging station 10. Further, by moving the AUV 30 upward, the AUV 30 can separate from the charging station 10. Therefore, the AUV 30 and the charging station 10 can be more easily coupled to and separate from each other.

In the present embodiment, the captured portion 11 is swingable relative to the station main body 12. Therefore, even when the direction of the captured portion 11 is changed by being pulled through the string-shaped body 3, the posture of the station main body 12 relative to the water flow direction F can be stably maintained. Further, the fitting portion 41 is swingable relative to the holding portion 46 fixed to the underwater vehicle main body 31. Therefore, even when the direction of the captured portion 11 is changed by being pulled through the string-shaped body 3, the posture of the underwater vehicle main body 31 relative to the water flow direction F can be stably maintained.

In the present embodiment, when the charging station 10 is located at a position away from the AUV 30 by a short distance, the position of the AUV 30 relative to the charging station 10 is acquired based on the string-shaped body 3 illuminated with light by the light emitting portion 20. Therefore, the AUV 30 can be accurately moved closer to the charging station 10. Further, the light emitting portion 20 plays not only a role of emitting light toward the string-shaped body 3 for measuring the position of the AUV 30 but also a role of emitting light toward the AUV 30 for realizing the optical wireless communication with the AUV 30. Therefore, the number of parts of the charging station 10 can be reduced.

In the present embodiment, when the charging station 10 is located at a position away from the AUV 30 by a middle or long distance, the acoustic positioning device 36 can measure the position of the AUV 30 relative to the charging station 10 based on the acoustic signal transmitted from the transponder 23. Therefore, the AUV 30 can be guided to the charging station 10 from a position away from the charging station 10 by the middle or long distance.

The above-described embodiment is in all aspects illustrative, and should be interpreted as not restrictive. The scope of the present invention is defined by the appended claims rather than by the description preceding them, and all changes that fall within metes and bounds of the claims, or equivalence of such metes and bounds thereof are therefore intended to be embraced by the claims. For example, regarding the shapes of the charging station 10 and the AUV 30, the shapes and positions of the components provided at the charging station 10 and the AUV 30, and the like, all changes that fall within metes and bounds of the claims, or equivalence of such metes and bounds thereof are therefore intended to be embraced by the claims.

For example, the charging station 10 of the above embodiment is provided with the vertical wing 13 and the horizontal wing 14 for changing the posture by the water flow, and the AUV 30 is provided with the vertical wing 34 for changing the posture by the water flow. However, methods of changing the postures by the water flow are not limited to these. For example, the charging station 10 may change the posture by the water flow by: entirely forming the station main body 12 in a wing shape; or by designing the charging station 10 in consideration of the center of gravity.

In the above embodiment, the holding portion 46 of the capturing mechanism 40 holds the fitting portion 41 such that the fitting portion 41 is swingable about the axis C extending in the leftward/rightward direction of the AUV 30. However, for example, the capturing mechanism 40 may be configured such that: the pair of fixed portions 47a and 47b of the holding portion 46 are supported by the underwater vehicle main body 31 so as to be swingable in the upward/downward direction; and the fitting portion 41 swings about an axis extending in the forward/rearward direction of the AUV 30.

The positioning system of the AUV 30 is not limited to the above embodiment. For example, the acoustic positioning system does not have to be the SSBL type and may be an LBL type, a SBL type, or the like. Further, when the charging station 10 is located at a position away from the AUV 30 by a short distance, the AUV 30 may be moved closer to the charging station 10 by a method other than the above method using the image pickup device.

The light emitting portion 20 of the optical wireless communication device 19 also serves as a light emitting portion configured to emit light toward the string-shaped body 3. However, a light emitting portion configured to emit light toward the string-shaped body 3 may be provided separately from the light emitting portion 20 of the optical wireless communication device 19.

In the above embodiment, the ship that is the sea floating body 2 tows the charging station 10 and the AUV 30 coupled to the charging station 10, and this actively generates the water flow received by the AUV 30 and the charging station 10. However, the above embodiment is not limited to this. For example, at a place where certain water flow such as tidal current can be secured, the sea floating body does not have to move. In this case, the sea floating body may be, for example, a sinker fixed to the seabed and a buoy moored to the sinker.

REFERENCE SIGNS LIST 1 charging system
2 sea floating body
3 string-shaped body
10 charging station
11 captured portion
12 station main body
13 vertical wing
14 horizontal wing
16 supporting portion
17 upward extending portion
19 optical wireless communication device
20 light emitting portion
21 noncontact electricity supplying portion
23 transponder
30 AUV (autonomous underwater vehicle)
31 underwater vehicle main body
32 propulsion device
33 control device
35 noncontact electricity receiving portion
36 acoustic positioning device
39 optical wireless communication device
40 capturing mechanism
41 fitting portion
46 holding portion
F water flow direction

The invention claimed is:

1. A charging system for an autonomous underwater vehicle, the charging system comprising:
a sea floating body floating on a sea;
a charging station suspended in water from the sea floating body through a string-shaped body and located downstream of the sea floating body in a water flow direction by receiving a water flow, the charging station including a noncontact electricity supplying portion located at a position away from the string-shaped body; and
an autonomous underwater vehicle coupled to the charging station so as to be rotatable about the string-shaped body relative to the charging station, the autonomous underwater vehicle including a noncontact electricity receiving portion configured to receive electricity supplied from the noncontact electricity supplying portion, wherein:
the charging station takes by the water flow such a posture that the noncontact electricity supplying portion is located downstream of the string-shaped body in the water flow direction; and
in a state where the autonomous underwater vehicle is coupled to the charging station, the autonomous underwater vehicle takes by the water flow such a posture that the noncontact electricity receiving portion is located downstream of the string-shaped body in the water flow direction, such that the noncontact electricity receiving portion of the autonomous underwater vehicle and the noncontact electricity supplying portion of the charging station face each other so as to realize supply of the electricity.

2. The charging system according to claim 1, wherein:
the charging station includes
a captured portion fixed to the string-shaped body and
a station main body coupled to the captured portion; and
the autonomous underwater vehicle includes
an underwater vehicle main body and
a capturing mechanism provided at a front end portion of the underwater vehicle main body and configured to capture the captured portion so as to be rotatable about the string-shaped body relative to the captured portion.

3. The charging system according to claim 2, wherein:
the station main body includes
a supporting portion supporting the noncontact electricity supplying portion and
an upward extending portion extending upward from the supporting portion beyond the noncontact electricity supplying portion and including a tip end coupled to the captured portion; and
the noncontact electricity receiving portion is provided at a lower portion of the underwater vehicle main body.

4. The charging system according to claim 3, wherein:
the supporting portion is formed so as to extend from an upstream side to a downstream side along the water flow direction when the charging station receives the water flow;
the upward extending portion extends upward from one end of the supporting portion; and
the supporting portion is provided with a vertical wing and a horizontal wing.

5. The charging system according to claim 4, wherein:
the captured portion has a disc shape;
the string-shaped body is connected to a center of an upper surface of the captured portion; and
the capturing mechanism includes a fitting portion which is open to a front side and a lower side, the string-shaped body being inserted into the fitting portion from the front side, the captured portion being inserted into the fitting portion from the lower side.

6. The charging system according to claim 5, wherein:
the upward extending portion is coupled to the captured portion so as to be swingable about an axis extending in a direction perpendicular to the string-shaped body; and
the capturing mechanism includes a holding portion fixed to the front end portion of the underwater vehicle main body, the holding portion holding the fitting portion so as to be swingable about an axis extending in a leftward/rightward direction of the autonomous underwater vehicle.

7. The charging system according to claim 1, wherein:
the charging station is provided with a light emitting portion configured to illuminate the string-shaped body with light; and
the autonomous underwater vehicle includes
an image pickup device,
a propulsion device, and
a control device configured to control the propulsion device based on data of an image taken by the image pickup device.

8. The charging system according to claim 1, wherein:
the charging station is provided with a transponder configured to transmit an acoustic signal; and
the autonomous underwater vehicle is provided with an acoustic positioning device configured to measure a distance to the transponder based on the acoustic signal transmitted from the transponder.

9. The charging system according to claim 1, wherein the autonomous underwater vehicle and the charging station are provided with respective optical wireless communication devices configured to mutually perform optical wireless communication.

10. The charging system according to claim 1, wherein the sea floating body is a ship that sails on the sea.

* * * * *